(12) United States Patent
Zaid et al.

(10) Patent No.: US 8,512,449 B1
(45) Date of Patent: Aug. 20, 2013

(54) OIL-SOLUBLE TRIAZINE SULFIDE SCAVENGER

(75) Inventors: Gene H. Zaid, Sterling, KS (US); Beth Ann Wolf, Hutchinson, KS (US)

(73) Assignee: Jacam Chemical Company 2013, LLC, Sterling, KS (US)

( * ) Notice: Subject to any disclaimer, the term of this patent is extended or adjusted under 35 U.S.C. 154(b) by 209 days.

(21) Appl. No.: 12/960,198

(22) Filed: Dec. 3, 2010

(51) Int. Cl.
*B01D 53/14* (2006.01)

(52) U.S. Cl.
USPC ............... 95/235; 252/60; 252/184; 423/226; 423/228

(58) Field of Classification Search
USPC .................................................. 95/149–266
See application file for complete search history.

(56) References Cited

U.S. PATENT DOCUMENTS

| | | | |
|---|---|---|---|
| 2,776,870 A | | 1/1957 | Fischer |
| 4,044,100 A | * | 8/1977 | McElroy, Jr. ................. 423/226 |
| 4,107,270 A | | 8/1978 | Ferrin et al. |
| 4,112,049 A | | 9/1978 | Bozzelli et al. |
| 4,436,713 A | | 3/1984 | Olson |
| 4,443,423 A | | 4/1984 | Olson |
| 4,515,759 A | | 5/1985 | Burnes et al. |
| 4,748,011 A | | 5/1988 | Baize |
| 4,978,512 A | * | 12/1990 | Dillon ........................... 423/226 |
| 5,128,049 A | | 7/1992 | Gatlin |
| 5,354,453 A | * | 10/1994 | Bhatia ........................... 208/236 |
| 5,462,721 A | * | 10/1995 | Pounds et al. ................. 423/226 |
| 5,589,149 A | | 12/1996 | Garland et al. |
| 5,674,377 A | * | 10/1997 | Sullivan et al. ........... 208/208 R |
| 5,733,516 A | | 3/1998 | DeBerry |
| 5,738,834 A | | 4/1998 | Deberry |
| 5,744,024 A | | 4/1998 | Sullivan, III et al. |
| 5,980,845 A | | 11/1999 | Cherry |
| 6,267,938 B1 | | 7/2001 | Warrender et al. |
| 6,818,194 B2 | | 11/2004 | DeBerry et al. |
| 7,078,005 B2 | * | 7/2006 | Smith et al. .................... 423/226 |
| 7,115,215 B2 | | 10/2006 | Titley et al. |
| 7,438,877 B2 | * | 10/2008 | Salma et al. .................. 423/220 |
| 7,459,012 B2 | * | 12/2008 | Davis et al. ...................... 95/235 |
| 7,517,447 B2 | | 4/2009 | Gatlin |
| 7,935,323 B2 | | 5/2011 | Schulz et al. |
| 2002/0139717 A1 | * | 10/2002 | Titley et al. .................... 208/236 |
| 2009/0065445 A1 | | 3/2009 | Westlund et al. |
| 2009/0263302 A1 | | 10/2009 | Hu |
| 2010/0163255 A1 | | 7/2010 | Horton et al. |
| 2011/0130298 A1 | | 6/2011 | Gonzalez et al. |

FOREIGN PATENT DOCUMENTS

| | | |
|---|---|---|
| GB | 1325913 | 8/1973 |
| GB | 2245588 A * | 1/1992 |
| GB | 2290542 A * | 1/1996 |
| RU | 2118649 C1 | 9/1998 |
| WO | WO9301126 A1 | 1/1993 |
| WO | WO2008049188 A1 | 5/2008 |

OTHER PUBLICATIONS

Rinaldi "Acid Gas Absorption by Means of Aqueous Solutions of Regenerable Phenol-Modified Polyalkylenepolyamine". Ind.Eng. Chem.Res. 1997, 36, pp. 3778-3782.
Material Safety Data Sheet—WGS 50WC H2S Remover; Dec. 23, 2002.
Bakke et al, "Hydrogen Sulfide Scavenging by 1,3,5-Triazinanes. Comparison of the Rates of Reaction". Ind. Eng. Chem. Res. 2004, 43, pp. 1962-1965.
Taylor et al, "Structural Elucidation of the Solid Byproduct from the Use of 1,3,5-Tris(hydroxyalkyl)hexahydro-s-triazine Based Hydrogen Sulfide Scavengers". Ind. Eng. Chem. Res. 2011, 50, pp. 735-740.
JACAM Product Bulletin. WGS 50WC Gas Sweetener. Revised Aug. 23, 2004.

* cited by examiner

*Primary Examiner* — Duane Smith
*Assistant Examiner* — Joubert X Glover
(74) *Attorney, Agent, or Firm* — Hovey Williams LLP

(57) ABSTRACT

The present invention is directed to water-dispersible, oil-soluble triazine sulfide-scavenging compositions for use in hydrocarbon recovery and processing applications. The compositions include a triazine component, a glycol ether component, and an optional alcohol component. The compositions contain a minor amount of water up to a maximum of about 15% by volume. The compositions can be used in any type of sulfide-scavenging operation and significantly reduce corrosion problems found with conventional triazine scavengers.

17 Claims, No Drawings

OIL-SOLUBLE TRIAZINE SULFIDE SCAVENGER

BACKGROUND OF THE INVENTION

1. Field of the Invention

The present invention is broadly concerned with oil-soluble sulfide-scavenging compositions operable for reducing or essentially eliminating H2S and other objectionable sulfides from hydrocarbon streams or transmission lines and equipment for such products. More particularly, the invention is concerned with such compositions, methods of sulfide-scavenging using the compositions, and methods of preparing the compositions, wherein the compositions comprise respective quantities of triazine and glycol ether, with a minor amount of water up to a maximum of about 15% by volume. The relatively low moisture contents of the compositions, together with the oil solubility thereof, permit scavenging operations in pipelines or equipment with a significant reduction or elimination of corrosion problems experienced with conventional aqueous triazine scavengers.

2. Description of the Prior Art

Natural gas is a naturally occurring mixture of hydrocarbon and non-hydrocarbon gases found in geologic formations beneath the earth's surface, often in association with petroleum. As obtained from oil and gas wells, raw or sour natural gas contains a number of impurities which must be removed before being introduced into a pipeline. The principal impurities in natural gas are water, carbon dioxide, hydrogen sulfide and condensable hydrocarbons, such as propane, butane and pentane. These undesirable components are conventionally removed from raw natural gas streams in gas processing plants. The processing plants are normally located in the field and vary in size from small units to large, centrally located plants.

The composition of raw natural gas varies widely from field to field. For example, the methane content can vary between 45 percent and 96 percent by volume, while the hydrogen sulfide content may range from 0.1 ppm to 150,000 ppm. Since hydrogen sulfide is corrosive in the presence of water and poisonous in very small concentrations, it must be almost completely removed from natural gas streams before use and preferably before transport. As a result, many pipeline specifications limit the amount of hydrogen sulfide to less than 0.25 gr per 100 cu. ft. of gas.

The technology known in the art for removing hydrogen sulfide from raw natural gas was developed for large processing plants to remove hydrogen sulfide in continuous processes. These large processing plants are fed by one or more natural gas wells, each of which produces over 10 million cubic feet of natural gas per day. Many of these processes utilize commodity chemicals or proprietary materials to lower the hydrogen sulfide levels in natural gas to pipeline specifications. Also, many of these processes not only sweeten sour natural gas to pipeline specifications, but also regenerate most, if not all, of the sweetening compositions involved.

Generally, there are several methods for sweetening sour gas, i.e., for reducing the hydrogen sulfide content of new gas. For example, various chemicals may be added or injected "in-line" to natural gas pipelines. For example, these sweetening products may be injected at the well head, separators, glycol units, coolers, compressors, etc., to provide contact with the natural gas.

Materials used with such "in-line" injection systems include, e.g., various aldehydes. The hydrogen sulfide reacts rapidly with the aldehyde compounds producing various types of addition products, such as polyethylene sulfide, polymethylene disulfide and trithiane. Such a process is disclosed, e.g., in Walker, J. F., Formaldehyde, Rheinhold Publishing Company, New York, page 66 (1953).

U.S. Pat. No. 4,748,011 discloses a method for the separation and collection of natural gas comprising the use of a sweetening solution. The sweetening solution consists of an aldehyde, a ketone, methanol, an amine inhibitor, sodium or potassium hydroxides and isopropanol. The amine inhibitor includes alkanolamines to adjust the pH.

Although the aldehydes (e.g., formaldehyde) are effective in the reduction of the hydrogen sulfide level of natural gas and selective for sulfide compounds, they are known to form trithiane compounds upon reaction with the sulfides. The trithianes are solids which do not easily dissolve and therefore, clog gas lines.

Also, aldehydes are unstable, temperature sensitive and have the tendency to polymerize. Moreover, aldehydes are known carcinogens and environmental hazards. Accordingly, the use of aldehydes for sweetening natural gas has come under disfavor.

Alkanolamines may also be used to sweeten sour gas streams, e.g., in such "in-line" injection systems. Various alkanolamines may be used in such systems, e.g., monoethanolamine, diethanolamine, methyldiethanolamine and diglycolamine. For example, U.S. Pat. No. 2,776,870 discloses a process for separating acid components from a gas mixture comprising adding to the gas an absorbent containing water-soluble alphatic amines an alkanolamines, preferably ethanolamine.

However, the alkanolamines are not selective in their reaction with hydrogen sulfide. That is, alkanolamines absorb the total acid-gas components present in the gas stream, e.g., carbon dioxide, as well as H2S. Such non-selectivity is not desirable in many applications and therefore, the usage of alkanolamines has also come under disfavor for this reason.

Another method used for the reduction of the hydrogen sulfide level in gas streams is the use of an H2S scrubber tower which causes the gas to contact a sweetening medium. The scrubber/bubble tower processes are batch or one-step processes which increase the opportunity for contact between the natural gas and the sweetening product by providing a gas diffusion zone by way of, e.g., disparges, pall rings, wood chips, etc.

Sweetening materials used in such scrubber tower apparatuses include, e.g., the so-called "iron-sponges." The iron-sponge is actually a sensitive, hydrated iron oxide supported on wood chips or shavings. The iron oxide selectively reacts with the hydrogen sulfide in the gas to form iron sulfide. Although effective, the iron-sponge method is disadvantageous in that the final product is not easily disposed of (see, e.g., The Field Handling of Natural Gas, p 74, 3rd Ed (1972)).

Slurries of zinc oxide and iron oxides have also been used in such scrubber towers to effect sweetening in much the same way as the iron-sponge. However, disposal problems also exist with these slurries.

Caustic-based systems, such as those containing nitrites, may also be used in scrubber towers. Although effective, such systems produce elemental sulfur solids. Such systems are described in U.S. Pat. No. 4,515,759. Such caustic-based sweetening materials are undesirable since, as noted above, they produce solids (i.e., elemental sulfur). Accordingly, such systems cannot be used in "in-line" injection systems and may only be used in bubble towers. Moreover, such caustic-based sweetening systems are not regenerable, i.e., they must be used in a batch process.

Another known method for sweetening natural gas is the chemical solvent process. The chemical solvent process is a continuous process, whereby a sweetening solution is contacted with the gas stream in an absorber tower. In such a process, the total acid gases, including hydrogen sulfide and carbon dioxide are stripped off of the sweetening solution which is then regenerated. The chemical solvent processes cannot be performed in-line.

Alkanolamines of various types may also be used in these chemical solvent processes. However, as discussed above, the use of alkanolamines is limited due to their lack of selectivity for hydrogen sulfide and other organic sulfides in the gas streams.

Other chemical solvents known in the art and used for sweetening gas streams include piperazinone, as disclosed in U.S. Pat. No. 4,112,049; 1-formylpiperidine, as disclosed in U.S. Pat. No. 4,107,270; iron (III) complexes of N-(2-hydroxyethyl) EDTA, as disclosed in U.S. Pat. No. 4,107,270; and iron complexes of nitriloacetic acid, as disclosed in U.S. Pat. Nos. 4,436,713 and 4,443,423.

U.S. Pat. Nos. 4,978,512 and 7,438,877 describe triazine-based sweetening compositions which preferably utilize the reaction products of a reaction between an alkanolamine and an aldehyde as the triazine source. Generally, these triazine products have from 40-70% by volume water therein. This is a problem when the compositions are used as a part of in-line systems or spray systems to scavenge sulfides from petroleum transmission lines and equipment. Specifically, the high moisture contents of the compositions significantly contribute to corrosion of the transmission lines and equipment. In short, while adequate sulfide scavenging can be obtained, this can be largely offset by the concomitant issue of corrosion.

The following references describe further compositions and methods of scavenging.

| U.S. Pat. No. | Inventor(s) |
|---|---|
| 4,044,100 | McElroy |
| 5,462,721 | Pounds et al. |
| 5,589,149 | Garland et al. |
| 5,733,516 | DeBerry |
| 5,738,834 | Deberry |
| 6,267,938 | Warrender et al. |
| 6,818,194 | DeBerry et al. |
| 7,078,005 | Smith et al. |

| Published Patent Application | Inventor(s) |
|---|---|
| 2009/0263302 | Hu |

| Foreign Publications | Inventor(s) |
|---|---|
| WO9301126 | Gatlin |
| RU2118649 | Magsumovic et al. |
| GB1325913 | Payne et al. |

| Non-Patent Literature |
|---|
| Rinaldi. Acid Gas Absorption by Means of Aqueous Solutions of Regenerable Phenol-Modified Polyalkylenepolyamine Ind. Eng. Chem. Res. 1997, 36, pp. 3778-3782. |

SUMMARY OF THE INVENTION

The present invention overcomes the problems outlined above I connection with triazine sulfide-scavenging compositions, by providing liquid blend compositions which are water dispersible and oil soluble, while containing relatively minor amounts of water. Broadly speaking, the sulfide-scavenging compositions comprise a quantity of a triazine, and a quantity of a glycol ether, the composition having a minor amount of water with a maximum water content of about 15% by volume (more preferably 10% by volume), and being oil soluble. Preferably, the compositions also contain an alcohol.

In preferred forms, the triazine is present in the compositions at a level of from about 25-80% by volume, more preferably from about 40-60% by volume. The glycol ether is generally present at a level of from about 15-50% by volume, more preferably from about 20-40% by volume. When used, the alcohol is present at a level of from about 5-40% by volume, more preferably from about 15-30% by volume.

The preferred triazines for use in the invention are the reaction product of a reaction between an alkanolamine and an aldehyde, most preferably monoethanolamine and formaldehyde. The glycol ethers are advantageously selected from the group consisting of mono-, di-, and tri-alkylene ethers, glycol aryl ethers, and derivatives thereof. The optional alcohols are the lower alcohols and more especially the C1-C6 alkyl alcohols and mixtures thereof.

The compositions of the invention are advantageously prepared by removing water from an aqueous dispersion of a triazine to create a concentrated triazine product, followed by blending of the concentrate with a glycol ether. The water-removal step is preferably carried out by heating the aqueous triazine dispersion under vacuum.

In use, the compositions of the invention are contacted with target sulfide compounds for scavenging of the latter. For example, the compositions may be used in in-line sweetening operations or in bubble towers or the like.

DETAILED DESCRIPTION OF THE PREFERRED EMBODIMENT

The present invention provides liquid sulfide-scavenging blended compositions comprising a quantity of one or more triazines, and a quantity of one or more glycol ethers.

The compositions are water-dispersible and oil soluble, and have a minor amount of water therein with a maximum water content of about 15%, more preferably about 10%, by volume. The compositions provide excellent sulfide scavenging in the context of sulfide removal from oil or gas streams, and in the treatment of oil or gas transmission lines or equipment. The compositions are capable of scavenging a wide variety of sulfur-bearing compounds, such as sulfhydryl compounds including hydrogen sulfide and organic sulfides (e.g., mercaptans, thiols, and sulfur-bearing carboxylic acids).

The Triazine Component

The triazines useful in the invention include the three isomers of triazine (1,2,3-, 1,2,4-, and 1,3,5-triazine) as well as derivatives thereof, which may be aromatic or non-aromatic. For example, some of the useful triazines are represented by the structural formula

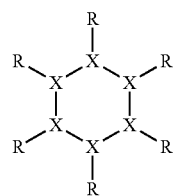

where three of the X members of the ring are nitrogen and the remaining X members of the ring are carbon, each R substituent bound to a nitrogen member being independently selected from the group consisting of nothing (i.e., it does not exist), H, C1-C20 straight or branched chain alkyl, alkenyl, and alkynyl groups, and hydroxyl derivatives of such groups, and each R substituent bound to a carbon member is independently selected to the group consisting of H, C1-C20 straight or branched chain alkyl, alkenyl, and alkynyl groups, and hydroxyl derivatives of such groups. Mixtures of various triazines may also be used. In preferred forms, the isomers of triazine are used, meaning that each of the R substituents bound to a nitrogen is nothing, and each of the R substituents bound to a carbon is H. These preferred triazines are aromatic in character. Other useful triazines are those fully described in U.S. Pat. No. 7,438,877, namely triazine derivatives having both hydroxyalkyl and alkylamine functionalities made by reacting an alkanolamine, at least one alkyl amine, and an aldehyde. This patent is incorporated by reference in its entirety herein.

Preferably, the triazine component is the reaction product of an alkanolamine and an aldehyde, advantageously the lower alkanolamines (i.e., the C1-C6 alkanolamines) and the lower aldehydes (i.e., the C1-C6 aldehydes), where in both cases the C1-C6 moiety is a straight or branched chain alkyl group. The most preferred reactants are monoethanolamine and formaldehyde. The reaction products comprise primarily a mixture of one or more triazines and a bisoxoazolidine, although other intermediates and/or polymers thereof may be present. Where monoethanolamine and formaldehyde are the reactants, the reaction products are chiefly 1,3,5-tri-(2-hydroxymethyl)-hexahydro-S-triazine, N,N-methylene bisoxoazolidine, and mixtures thereof. The relative amounts of the reaction products depend on the stoichiometry of the reaction, and the stoichiometry can be adjusted to thereby determine the respective quantities of the reaction products. In the case of a monoethanolamine/formaldehyde reaction, the molar ratio of monoethanolamine to formaldehyde is from about 1:0.25 to about 1:10, and preferably from about 1:1 to about 1:1.5. Further details regarding the preferred synthesis of the triazines can be found in U.S. Pat. No. 4,978,512, incorporated herein in its entirety.

In practice, the triazine employed in the invention is a modified form of a triazine commercialized by JaCam Chemical Co. of Sterling, Kans. under the designation "WGS 50WC H2S Scavenger." This product as sold contains approximately 70% water, has a density of 9.1 lbs./gal, a specific gravity of 1.06-1.12, and a pH of 10-11.5.

In order to render this commercial product suitable for the invention, it is necessary to remove a substantial fraction of the water. This is preferably accomplished by heating the commercial product under vacuum, e.g., heating to a temperature of about 120-200° F. (more preferably from about 140-180° F., most preferably about 160° F.), under a vacuum of from about 10-29 in. Hg (more preferably from about 15-25 in. Hg), for a time of from about 1-6 hours (more preferably from about 2-4 hours). However accomplished, the final triazine will have a minor amount of water therein, and up to about 15% by volume, as noted previously.

The triazine component should be present in the overall compositions of the invention at a level of from about 25-80% by volume, and more preferably from about 40-60% by volume.

The Glycol Ether Component

The glycol ethers usable in the compositions of the invention are preferably selected from the group consisting of glycol mono-, di-, and tri-alkylene ethers, glycol aryl ethers, derivatives of the foregoing, and mixtures thereof, where the alkylene groups may be straight or branched chain, and the aryl groups may be any aromatic species, such as mono- or poly-phenyls. The derivatives may again be any form of the foregoing ethers, such as the acetates, acylates, amides, and nitriles. The single most preferred glycol ether for use in the invention is glycol butyl ether, also known as 2-butoxyethanol, CAS #111-76-2. However, other glycol ethers may also be used, alone or in combination, such as the exemplary glycols set forth in the Table below.

| Chemical | Chemical Synonym | CAS # |
| --- | --- | --- |
| Ethylene glycol monomethyl ether (EGME) | 2-methoxyethanol | 109-86-4 |
| Ethylene glycol monoethyl ether (EGEE) | 2-ethoxyethanol | 110-80-5 |
| Ethylene glycol monoethyl ether (EGEEA) acetate | 2-ethoxyethanol acetate 2-ethoxyethyl acetate | 111-15-9 |
| Ethylene glycol monobutyl ether acetate (EGBEA) | 2-butoxyethanol acetate Butyl glycol acetate 2-butoxyethyl acetate | 112-07-2 |
| Ethylene glycol monopropyl ether (EGPE) | 2-propoxyethanol | 2807-30-9 |
| Ethylene glycol monophenyl ether (EGPhE) | 2-phenoxyethanol | 122-99-6 |
| Ethylene glycol monohexyl ether (EGHE) | 2-hexyloxyethanol | 112-25-4 |
| Ethylene glycol mono 2-ethylhexyl ether | 2-(2-ethylhexyloxy) ethanol | 1559-35-7 |

The glycol component is normally present in the compositions of the invention at a level of from about 15-50% by volume, and more preferably from about 20-40% by volume.

The Optional Alcohol Component

The alcohol component, when used, is preferably an organic mono- or poly-alcohol including a C1-C18 organic moiety. More preferably, the alcohol is a C1-C6 mono-alcohol, where the C1-C6 group is a straight or branched chain alkyl group. The most preferred alcohols are selected from methanol, ethanol, propanol, butanol, and mixtures thereof, with methanol normally being used.

The Preferred Scavenging Compositions

The single most preferred composition in accordance with the invention is a blend containing 50% by volume of the dewatered WGS 50WC H2S Scavenger product having a moisture content of up to about 10% by volume, 30% by volume of ethylene glycol monobutyl ether, and 20% by volume methanol. The composition is clear, has an aromatic odor, a pour point of −29° F., a flash point of 54° F., density of 9.1 lbs./gal, specific gravity of 1.00-1.05, and a pH of 10.0-11.5. Testing of the preferred composition confirmed that 10 grams of the liquid product neutralized 6.51 grams of hydrogen sulfide.

As outlined above, however, the compositions of the invention are not limited to this preferred formulation, but may have the described ranges of triazine, ether, and alcohol (when used). Additionally, the pH of the compositions may be variable, and may range from about 6-13, more preferably from about 9-12.

The compositions of the invention are also oil soluble, in order to ensure that the compositions blend into liquid or gaseous hydrocarbon products (e.g., crude oil or natural gas) for maximum scavenging of sulfides. The property of oil solubility in the context of the present compositions is conveniently determined using a xylene solubility test. This test involves mixing 25 ml of xylene with 75 ml of the composition. The mixture is then placed in a freezer at −30° F. overnight. After this treatment, the product is removed from the freezer and allowed to come to ambient temperature. If there is no separation of the ingredients, the composition is considered to be oil soluble.

Sulfide-Scavenging Methods

The scavenging compositions of the invention can be used in a variety of ways in order to reduce or substantially eliminate H2S and other objectionable sulfides from hydrocarbon streams (e.g., crude oil or natural gas), and to scavenge hydrocarbon transmission lines or equipment (e.g., well heads, separators, glycol units, coolers, and compressors).

For example, the present scavenging compositions may be employed with "in-line" injection systems to reduce the hydrogen sulfide level in sour gas streams. The scavenging compositions may be injected at any point in-line which will provide the compositions the opportunity to react with a gaseous or liquid hydrocarbon stream, e.g., at the well-head, at the or separators. In such an in-line injection system, the temperature and pressure of the gas system is not critical for the success of the scavenging method. Accordingly, within wide limits, the existing system conditions need not be altered for effective scavenging.

When using an in-line injection method for sweetening natural gas, the scavenging compositions of the invention may be injected directly into the flow line at a rate of between about 0.3 to about 1.0 gallons per ppm hydrogen sulfide per MMSCF of gas. However, the rate of injection may be varied from system to system, as will be evident to one skilled in the art.

The compositions of the invention may also be used with H2S scrubber or bubble towers, or in chemical solvent processes. In each of these systems, towers are used to increase the contact time between the scavenging compositions and the gaseous hydrocarbon stream, thereby improving efficiencies over in-line systems.

In scrubber/bubble tower systems, the scavenging compositions are preferably used without further dilution, or with additional alcohol or other non-aqueous solvents. The hydrocarbon stream is then delivered to the bottom of the tower and passes upwardly through the diluted scavenging composition to effect the desired result. Such tower systems are the preferred apparatus in which to sweeten hydrocarbon streams, owing to the high efficiencies and relatively low capital investments of such systems. Use of the present composition permits gas sweetening without carryover of water vapor, which minimizes and eliminates corrosion in downstream equipment In chemical solvent processes, the sulfides are stripped from the scavenging compositions after the sweetening reaction. Accordingly, in such systems, the compositions may be part of continuous, recirculating processes, and may be regenerated and reused. The amounts of the scavenging compositions are variable depending upon the particular application (e.g., the tower sizes and the amounts of sulfides present, etc.).

Operators also periodically treat their empty flow lines and equipment with sulfide scavengers in order to scavenge residual sulfides on the surfaces of the lines and equipment. This is done by spraying the scavenger onto these surfaces using a moving spray head. The compositions of the invention are very well suited for such spray treatments, and, owing to the low moister contents of the compositions, minimize corrosion problems which have plagued prior aqueous triazine scavengers.

We claim:

1. A liquid sulfide-scavenging composition comprising from about 25-80% by volume of a triazine, from about 15-50% by volume of a glycol ether, and from about 5-40% by volume of an alcohol, said composition having a minor amount of water with a maximum water content of about 15% by volume, and being oil soluble, the triazine being a reaction product of a C1-C6 alkanolamines and a C1-C6 aldehydes, where the C1-C6 moiety in each instance is a straight or branched chain alkyl group.

2. The composition of claim 1, said triazine being present at a level of from about 40-60% by volume.

3. The composition of claim 1, said glycol ether being present at a level of from about 20-40% by volume.

4. The composition of claim 1, said alcohol being present at a level of from about 15-30% by volume.

5. The composition of claim 1, said alcohol comprising methanol.

6. The composition of claim 1, said glycol ether being selected from the group consisting of glycol mono-, di-, and tri-alkylene ethers, glycol aryl ethers, and derivatives thereof.

7. The composition of claim 6, said glycol ether selected from the group consisting of glycol C2-C6 monoalkylene ethers.

8. The composition a claim 7, said glycol ether comprising glycol butyl ether.

9. The composition of claim 1, said composition having a maximum water content of up to about 10% by volume.

10. The composition of claim 1, said composition haying a pH of from about 6-13.

11. The composition of claim 10, said pH being from about 9-12.

12. The composition of 1, including a mixture of triazines.

13. The composition of claim 1, including a mixture of glycol ethers.

14. A method of scavenging sulfide compounds comprising the step of contacting said sulfide compounds with the composition of claim 1.

15. The method of claim 14, said sulfide compounds being present in a stream of natural gas, and said contacting step comprising the steps of providing a quantity of said composition and passing said stream through said quantity of said composition.

16. The method of claim 14, said sulfide compounds being present within oil or gas transmission lines or equipment, and said contacting step comprising the step of spraying said composition into said transmission lines or equipment.

17. The method of claim 14, including the step of contacting said composition with a hydrocarbon containing sulfides.

* * * * *